(12) United States Patent
Yamamoto et al.

(10) Patent No.: US 12,614,267 B2
(45) Date of Patent: Apr. 28, 2026

(54) OUTPUT DEVICE

(71) Applicant: TOYOTA JIDOSHA KABUSHIKI KAISHA, Toyota (JP)

(72) Inventors: Shusuke Yamamoto, Tokyo (JP); Chikara Okazaki, Gotemba (JP); Kohta Watatsu, Nagoya (JP); Hideyuki Tanaka, Nisshin (JP); Shinya Murase, Nagoya (JP); Yuki Tatsumoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 294 days.

(21) Appl. No.: 18/378,787

(22) Filed: Oct. 11, 2023

(65) Prior Publication Data

US 2024/0153056 A1 May 9, 2024

(30) Foreign Application Priority Data

Nov. 4, 2022 (JP) ................................ 2022-177459

(51) Int. Cl.
*G06T 7/00* (2017.01)

(52) U.S. Cl.
CPC .. *G06T 7/0002* (2013.01); *G06T 2207/10032* (2013.01); *G06T 2207/30236* (2013.01)

(58) Field of Classification Search
CPC ......... G06T 7/0002; G06T 2207/10032; G06T 2207/30236; G08G 1/012; G08G 1/0129; G08G 1/0141; G08G 1/096716; G08G 1/096775; G08G 1/04; G06Q 50/265; G06F 16/29
USPC ......................................................... 382/103
See application file for complete search history.

(56) References Cited

U.S. PATENT DOCUMENTS

| | | | | |
|---|---|---|---|---|
| 11,554,776 B2 * | 1/2023 | Nagel | ................... | G08G 1/0116 |
| 2012/0323485 A1 * | 12/2012 | Mutoh | .................... | G01S 19/13 |
| | | | | 701/428 |
| 2016/0358467 A1 * | 12/2016 | Jeong | ................... | G08G 1/0133 |
| 2019/0242718 A1 * | 8/2019 | Siskind | ............. | G01C 21/3461 |

FOREIGN PATENT DOCUMENTS

| | | | |
|---|---|---|---|
| JP | 2012189462 A | * | 10/2012 |
| JP | 2017-015460 A | | 1/2017 |
| JP | 2017-215181 A | | 12/2017 |

* cited by examiner

*Primary Examiner* — Jennifer Mehmood
*Assistant Examiner* — Pardis Sohraby
(74) *Attorney, Agent, or Firm* — Oliff PLC

(57) ABSTRACT

An output device including: a memory; and a processor coupled to the memory, the processor configured to: acquire a satellite image in which a target region is photographed and event information relating to events that have occurred in the target region; and output, from among roads in the target region, a road for which a safety degree calculated based on the satellite image and the event information is less than a threshold value.

5 Claims, 5 Drawing Sheets

OUTPUT DEVICE

CROSS-REFERENCE TO RELATED APPLICATION

This application is based on and claims priority under 35 USC 119 from Japanese Patent Application No. 2022-177459 filed on Nov. 4, 2022, the disclosure of which is incorporated by reference herein.

BACKGROUND

Technical Field

The present disclosure relates to an output device.

Related Art

Japanese Patent Application Laid-Open (JP-A) No. 2017-015460 discloses an information processing device. The information processing device acquires an image, photographed from the sky, of a region including one or more candidate routes from a starting point to a destination in order to present a brightness of the route to a pedestrian or the like. The information processing device then outputs a brightness of each of plural image regions segmented from the acquired image in association with the respective candidate routes.

The information processing device disclosed in Japanese Patent Application Laid-Open (JP-A) No. 2017-015460 has a problem in that safety of a road cannot be ensured in comparison to a case in which a safety degree in consideration of events other than a brightness of the road is output.

SUMMARY

The present disclosure has been made in consideration of the above facts, and an object thereof is to provide an output device capable of ensuring higher safety of a road compared with a case in which a safety degree calculated from only a brightness of a road is output.

Means for Solving the Problem

An output device according to a first aspect includes: an acquisition section that acquires a satellite image in which a target region is photographed and event information relating to events that have occurred in the target region; and an output section that outputs, from among roads in the target region, a road for which a safety degree calculated based on the satellite image and the event information is less than a threshold value.

In the output device according to the first aspect, the acquisition section acquires the satellite image in which the target region is photographed and the event information relating to events that have occurred in the target region, and the output section outputs, from among the roads in the target region, the road for which the safety degree calculated based on the satellite image and the event information is less than the threshold value. According to the output device according to the first aspect, higher safety can be ensured compared with a case in which a safety degree calculated from only the brightness of the road is output.

An output device according to a second aspect is the output device according to the first aspect, wherein the output section outputs a road for which a crime prevention safety degree incorporates a crime prevention safety degree calculated based on a brightness of the road during nighttime and crime information relating to crimes that have occurred on the road is less than the threshold value.

According to the output device according to the second aspect, higher safety can be ensured from the viewpoint of crime prevention.

An output device according to a third aspect is the output device according to the first aspect or the second aspect, wherein a road for which the safety degree, which incorporating a traffic safety degree calculated based on vehicles traveling on the road and accident information relating to traffic accidents that have occurred on the road, is less than the threshold value is output.

According to the output device according to the third aspect, higher safety can be ensured from the viewpoint of traffic safety.

An output device according to a fourth aspect is the output device according to any one of the first aspect to the third aspect, wherein the output section outputs a road for which a sum of a crime prevention safety degree calculated based on a brightness of the road during nighttime and crime information relating to crimes that have occurred on the road, and a traffic safety degree calculated based on vehicles traveling on the road and accident information relating to traffic accidents that have occurred on the road, is less than the threshold value.

According to the output device according to the fourth aspect, higher safety can be ensured from the viewpoints of crime prevention and traffic safety.

An output device according to a fifth aspect is the output device according to any one of the first aspect to the fourth aspect, wherein the output section outputs a recommendation not to walk along the road for which the safety degree is less than the threshold value.

According to the output device according to the fifth aspect, higher safety can be ensured compared with a case in which a recommendation not to walk along the road for which the safety degree is less than the threshold value is not output.

According to the present disclosure, higher safety can be ensured compared with a case in which a safety degree calculated from only a brightness of a road is output.

BRIEF DESCRIPTION OF THE DRAWINGS

An exemplary embodiment of the present disclosure will be described in detail based on the following figures, wherein.

DETAILED DESCRIPTION

Figure 1:
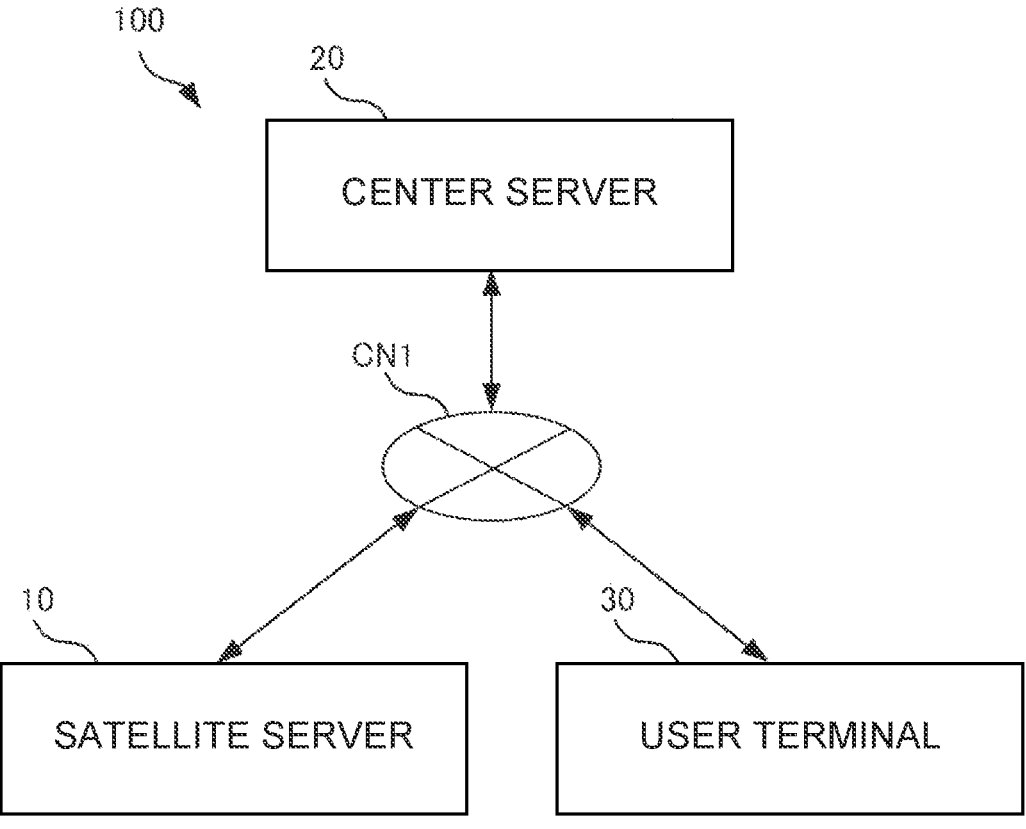
FIG. 1 is a diagram illustrating an example of a schematic configuration of an output system according to an exemplary embodiment.

As illustrated in FIG. 1, an output system 100 of the present exemplary embodiment is configured to include a satellite server 10, a center server 20, and a user terminal 30. The center server 20 is an example of an output device. It should be noted that a number of user terminals 30 included in the output system 100 is not limited to the number illustrated in FIG. 1. The satellite server 10, the center server 20, and the user terminal 30 are each connected to each other through a network CN1.

The satellite server 10 accumulates satellite images, which are images of the ground that have been photographed from the sky by an artificial satellite, an aircraft, or the like. More specifically, the satellite server 10 associates and accumulates the satellite images, times at which the satellite images were photographed, and regions in which the satellite images were photographed.

User Terminal

The user terminal 30 is a terminal such as a smartphone, a computer or the like that is possessed by a user.

Figure 2:
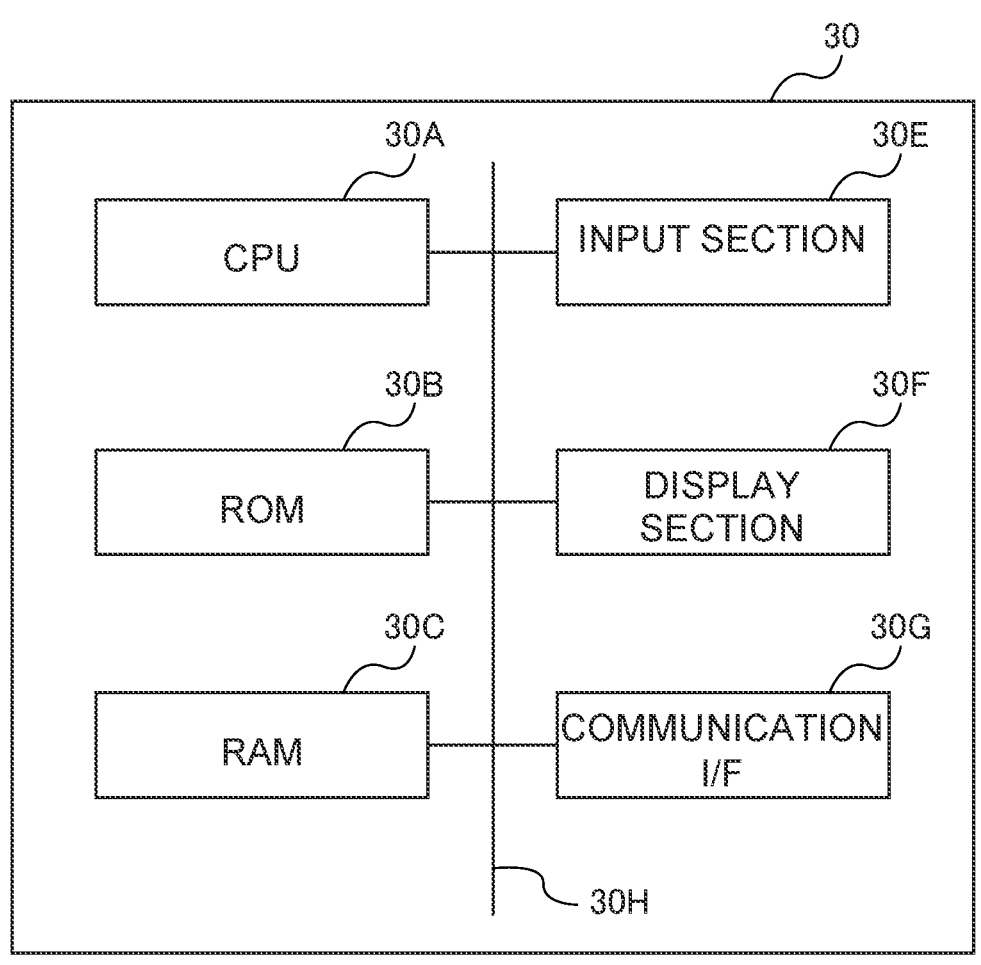
FIG. 2 is a block diagram illustrating an example of a hardware configuration of a user terminal according to the exemplary embodiment.

As illustrated in FIG. 2, the user terminal 30 is configured to include a central processing unit (CPU) 30A, a read only memory (ROM) 30B, a random access memory (RAM) 30C, an input section 30E, a display section 30F, and a communication interface (I/F) 30G. The CPU 30A, the ROM 30B, the RAM 30C, the input section 30E, the display section 30F, and the communication I/F 30G are connected so as to be capable of communicating with each other via an internal bus 30H. It should be noted that the user terminal 30 may include a non-volatile memory such as an SD card or the like, in addition to the ROM 30B.

The CPU 30A executes various programs and controls various sections. Namely, the CPU 30A, which is an example of a hardware processor, loads a program from the ROM 30B, which corresponds to a memory, and executes the program using the RAM 30C as a workspace.

The ROM 30B stores various programs and various data. The RAM 30C serves as a workspace to temporarily store programs and data.

The input section 30E is, for example, a keyboard, a push-button numeric keypad, a touch pad, and the like, and is used for carrying out input of various kinds of information by using the fingers of the user.

The display section 30F is, for example, a liquid crystal display, and displays various kinds of information. The display section 30F may be provided as a touch display that also serves as the input section 30E.

The communication I/F 20G is an interface for connecting to the network CN1.

Center Server

Figure 3:
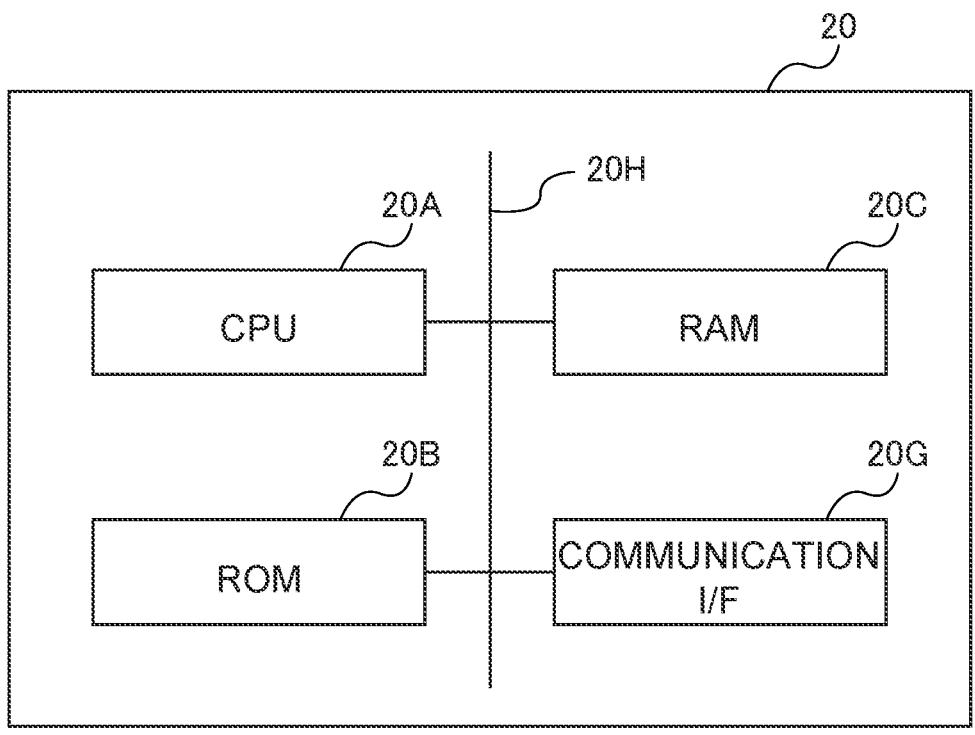
FIG. 3 is a block diagram illustrating an example of a hardware configuration of a center server according to the exemplary embodiment.

As illustrated in FIG. 3, the center server 20 is configured to include a CPU 20A, a ROM 20B, a RAM 20C, and a communication I/F 20G. The CPU 20A, the ROM 20B, the RAM 20C, and the communication I/F 20G are connected so as to be capable of communicating with each other via an internal bus 20H. It should be noted that the center server 20 may include a memory such as a storage or the like, in addition to the ROM 20B.

The CPU 20A executes various programs and controls various sections. Namely, the CPU 20A, which is an example of a hardware processor, loads a program from the ROM 20B, which corresponds to a memory, and executes the program using the RAM 20C as a workspace.

The ROM 20B stores various programs and various data. The RAM 20C serves as a workspace to temporarily store programs and data.

The ROM 20B of the present exemplary embodiment stores an output program and an event database.

The output program is a program for implementing various functionality possessed by the center server 20.

The event database stores crime information relating to crimes and accident information relating to traffic accidents. In the present exemplary embodiment, information identifying a crime (such as, for example, a name) and information identifying a road on which the crime occurred (such as, for example, a name or address) are stored in the event database as the crime information. Further, information identifying a traffic accident and information identifying a road on which the traffic accident occurred are stored in the event database as the accident information. However, there is no limitation to this example. The event database may store only one of the crime information or the accident information. Further, as the crime information, information that identifies a crime, information that identifies a road on which the crime occurred, and a date and time on which the crime occurred may be applied. Furthermore, as the accident information, information identifying a traffic accident, information identifying a road on which the traffic accident occurred, and a date and time on which the traffic accident occurred may be applied. Moreover, in the present exemplary embodiment, a sidewalk is applied as a road. However, there is no limitation to this example. As the road, a road including a roadway in addition to a sidewalk may be applied.

The communication I/F 20G is an interface for connecting to the network CN1.

Figure 4:
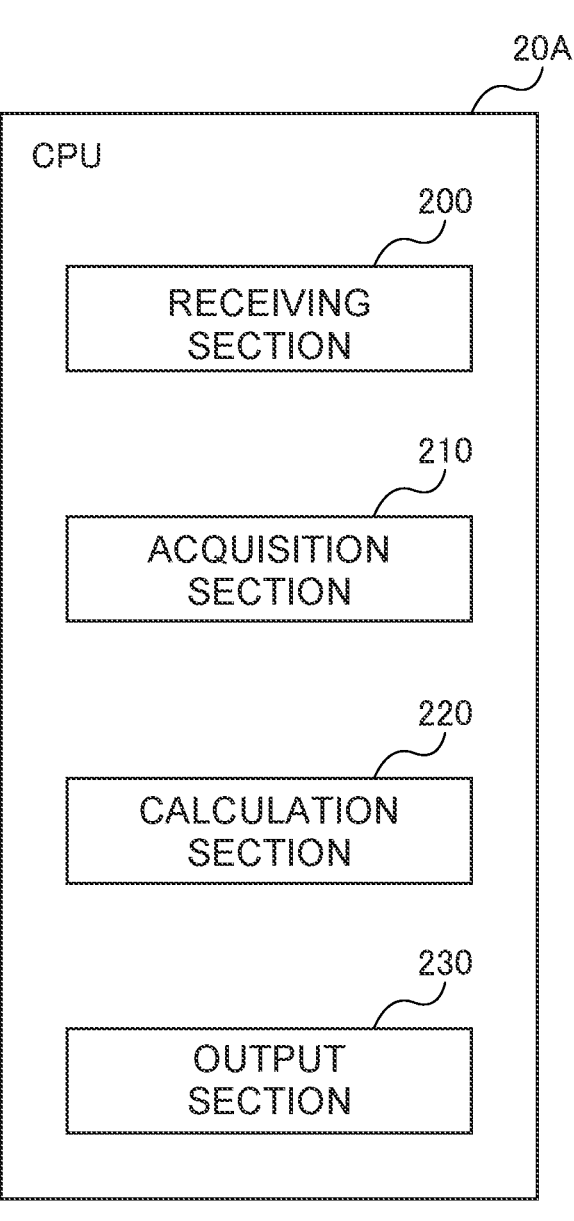
FIG. 4 is a block diagram illustrating an example of a functional configuration of a CPU in the center server according to the exemplary embodiment.

FIG. 4 is a block diagram illustrating an example of a functional configuration of the CPU 20A. As illustrated in FIG. 4, the CPU 20A includes a receiving section 200, an acquisition section 210, a calculation section 220, and an output section 230. The respective functional configuration is implemented by the CPU 20A reading and executing the output program stored in the ROM 20B.

The receiving section 200 receives a target region. In the present exemplary embodiment, the receiving section 200 receives the target region from the user terminal 30 via the communication I/F 20G.

Further, the receiving section 200 also receives a threshold value of a safety degree. The threshold value of the safety degree is a threshold value of a safety degree for determining whether or not the output section 230, which will be described later, is to output a road in the target region (hereafter simply referred to as a "road"). In the present exemplary embodiment, the receiving section 200 receives the threshold value of the safety degree from the user terminal 30 via the communication I/F 20G. However, there is no limitation to this example. For example, the receiving section 200 may receive the threshold value of the safety degree from an administrator of the center server 20 or the like. Alternatively, the receiving section 200 may receive any one rank from among ranks of safety degree that are set in plural stages, and set a threshold value corresponding to the received rank as the threshold value of the safety degree.

Further, the receiving section 200 may further receive at least one of a target day or a target time. In this case, the receiving section 200 receives at least one of the target day or the target time from the user terminal 30 via the communication I/F 20G.

The acquisition section 210 has a function of acquiring a satellite image in which the target region is photographed (hereafter also referred to simply as a "satellite image"). More specifically, the acquisition section 210 acquires the satellite image from the satellite server 10 via the communication I/F 20G. The acquisition section 210 acquires at least one satellite image that has been photographed during nighttime. In other words, the acquisition section 210 does not need to acquire a satellite image that has been photographed during daytime. In the present exemplary embodiment, from 6:00 p.m. to 4:00 a.m. the following morning is applied as nighttime. However, there is no limitation to this example. As nighttime, a time slot received from the user terminal 30, such as from sunset to sunrise on the following morning or the like, may be applied.

In the present exemplary embodiment, the acquisition section 210 transmits the target region received by the receiving section 200 to the satellite server 10. The satellite server 10 then transmits at least one satellite image in which the target region has been photographed during nighttime. The acquisition section 210 thereby acquires at least one satellite image that has been photographed during nighttime.

It should be noted that in a case in which the receiving section 200 receives a target day, the acquisition section 210 acquires a satellite image that was photographed on a date that is associated with the target day. For example, the acquisition section 210 acquires a satellite image that was photographed on a date for which at least one of the day of the week or the time period is the same as the target day. The time period is, for example, one week before and after the same month and day as the target day. For example, in a case in which the target day is Aug. 15, 2023 (Tuesday), the acquisition section 210 acquires at least one of a satellite image that was photographed on a Tuesday or a satellite image that was photographed from Aug. 8, 2022 to Aug. 22, 2022. It should be noted that the time period may be two weeks before and after the same month and day as the target day, or one month before and after the same month and day as the target day, or the like. Further, the question as to whether the acquisition section 210 acquires a satellite image photographed on a date for which the day of the week is the same as the target day, on a date for which the time period is the same as the target day, or on a date for which the day of the week and the time period are the same as the target day, may be determined in advance by the user terminal 30, or may be determined in advance by an administrator of the center server 20 or the like.

Further, the acquisition section 210 may acquire a satellite image of the target region that was photographed on a date for which at least one of the presence or absence of a holiday or the time period is the same as the target day. The presence or absence of a holiday indicates whether or not the day is a Saturday, a Sunday, or a public holiday. For example, in a case in which the target day is Aug. 15, 2023 (Tuesday), the target day is not a holiday. Accordingly, the acquisition section 210 acquires at least one of a satellite image that was photographed on a Monday, Tuesday, Wednesday, Thursday, or Friday that is a weekday, or a satellite image that was photographed from Aug. 8, 2022 to Aug. 22, 2022.

Further, in a case in which the receiving section 200 receives a target time, the acquisition section 210 acquires a satellite image that was photographed during a time slot that is the same as the target time received by the receiving section 200. In this case, the acquisition section 210 acquires a satellite image that was photographed during a time slot that is the same as the target time, rather than a satellite image that was photographed during nighttime. The time slot is, for example, 30 minutes before and after the target time received by the receiving section 200. For example, in a case in which the target time is 13:00, the acquisition section 210 acquires a satellite image that was photographed from 12:30 to 13:30. It should be noted that the time slot may be one hour before and after the target time received by the receiving section 200, three hours before and after the target time received by the receiving section 200, or the like.

Further, in the present exemplary embodiment, the acquisition section 210 has a function of acquiring event information relating to events that have occurred in the target region. In the present exemplary embodiment, the crime information relating to the target region and the accident information relating to the target region are applied as the event information. However, there is no limitation to this example. Only one of the crime information relating to the target region or the accident information relating to the target region may be applied as the event information. More specifically, the acquisition section 210 acquires the crime information relating to the target region and the accident information relating to the target region from the event database.

It should be noted that in a case in which the receiving section 200 receives the target day, the acquisition section 210 acquires crime information relating to crimes that have occurred in the target region on a date for which at least one of the day of the week or the time period is the same as the target day, and also acquires accident information relating to traffic accidents that have occurred in the target area on that date.

Further, in a case in which the receiving section 200 receives the target time, the acquisition section 210 acquires crime information relating to crimes that have occurred in the target region during a time slot that is the same as the target time, and also acquires accident information relating to traffic accidents that have occurred in the target region during that time slot.

The calculation section 220 calculates the safety degree based on the satellite image and the event information. In the present exemplary embodiment, a safety degree incorporates a crime prevention safety degree and a traffic safety degree is applied as the safety degree. Specifically, a total safety degree, which is a sum of the crime prevention safety degree and the traffic safety degree, is applied as the safety degree. However, there is no limitation to this example. Only one of the crime prevention safety degree or the traffic safety degree may be applied as the safety degree.

In the present exemplary embodiment, the calculation section 220 calculates the crime prevention safety degree based on the brightness of the road during nighttime and the crime information relating to crimes that have occurred on the road. More specifically, the calculation section 220 extracts road regions from the satellite image photographed during nighttime that has been acquired by the acquisition section 210, using a method of tracking edges or the like. The calculation section 220 then calculates an illuminance in each of the road regions. The calculation section 220 then calculates an evaluation value of brightness of each road based on the calculated illuminances. For example, the calculation section 220 assigns an evaluation value of brightness determined in proportion to a magnitude of the illuminance, to each of the roads.

Further, the calculation section 220 assigns an evaluation value of crime information to each of the roads. In the present exemplary embodiment, the calculation section 220 assigns 0 to roads on which a crime has occurred, and assigns an identical evaluation value to roads on which no crime has occurred. However, there is no limitation to this example. For example, the calculation section 220 may assign an evaluation value of crime information determined in inverse proportion to a weight of a sentencing for the crime that has occurred, to each of the roads. Further, the calculation section 220 may apply an evaluation value of information relating to whether or not a person, such as police, a store or the like, from whom assistance can be requested when a crime has occurred, is present on a road, in place of the evaluation value of crime information.

The calculation section 220 then calculates the sum of the evaluation value of brightness of the road and the evaluation value of crime information of the road as the crime prevention safety degree. However, there is no limitation to this example. The calculation section 220 may apply an average value of the evaluation value of brightness of the road and the evaluation value of crime information of the road as the crime prevention safety degree, or may apply a weighted sum, average value, or the like, so as to give priority to either one of the evaluation value of brightness of the road or the evaluation value of crime information of the road.

Further, the calculation section 220 calculates the traffic safety degree based on vehicles travelling on the road and the accident information relating to traffic accidents that have occurred on the road. More specifically, the calculation section 220 extracts road regions from the satellite image using a method of tracking edges or the like. In this regard, in a case in which the acquisition section 210 has acquired only a satellite image that was photographed during nighttime, the calculation section 220 extracts the road regions from the satellite image that was photographed during nighttime. On the other hand, in a case in which the acquisition section 210 has acquired a satellite image that was photographed at a time other than during nighttime, the calculation section 220 may extract the road regions from the satellite image that was photographed at the time other than during nighttime.

The calculation section 220 then extracts front and rear surfaces of vehicles from the extracted road regions, and calculates numbers of vehicles traveling on the roads. The calculation section 220 then calculates an evaluation value of vehicles on each of the roads from the calculated number of vehicles. For example, the calculation section 220 assigns an evaluation value of vehicles determined in inverse proportion to the number of vehicles, to each of the roads. However, there is no limitation to this example. The calculation section 220 may calculate an evaluation value of vehicles on each of the roads from an average value of sizes or speeds of the vehicles traveling on the road. In this case, the calculation section 220 assigns an evaluation value of vehicles determined in inverse proportion to the average value of sizes or speeds of the vehicles, to each of the roads.

Further, the calculation section 220 assigns an evaluation value of accident information to each of the roads. In the present exemplary embodiment, the calculation section 220 assigns 0 to roads on which a traffic accident has occurred, and assigns an identical evaluation value to roads on which no traffic accident has occurred. However, there is no limitation to this example. For example, the calculation section 220 may assign an evaluation value of accident information that is determined so as to be lower in a case in which the traffic accident that has occurred is a personal injury accident in comparison to a case in which the traffic accident is a property damage accident, to each of the roads. Further, the calculation section 220 may assign an evaluation value of accident information that is determined in inverse proportion to a length of time required for treatment of a victim of the traffic accident, to each of the roads. Furthermore, the calculation section 220 may apply an evaluation value of information relating to whether or not there is a facility that can respond when a traffic accident has occurred, such as police, a hospital or the like, in place of the evaluation value of accident information.

The calculation section 220 calculates the sum of the evaluation value of vehicles and the evaluation value of accident information as the traffic safety degree. However, there is no limitation to this example. The calculation section

220 may apply an average value of the evaluation value of vehicles and the evaluation value of accident information as the traffic safety degree, or may apply a weighted sum, average value, or the like so as to give priority to either one of the evaluation value of vehicles or the evaluation value of accident information.

The output section 230 has a function of outputting roads having a safety degree of less than a threshold value, from among roads in the target region. Namely, the output section 230 outputs roads for which the safety degree calculated by the calculation section 220 is less than the threshold value received by the receiving section 200. In the present exemplary embodiment, the output section 230 outputs the roads having a safety degree of less than the threshold value to the user terminal 30. It should be noted that the output section 230 may change the threshold value based on the time period or the time slot. Further, the output section 230 may output all of the safety degrees for each road, regardless of whether or not the safety degrees are less than the threshold value.

Further, the output section 230 has a function of outputting a recommendation not to walk along a road having a safety degree of less than the threshold value. However, there is no limitation to this example. The output section 230 may output a recommendation to walk along a road having a safety degree that is equal to or greater than the threshold value, or may output a recommendation not to travel in a vehicle on a road having a safety degree of less than the threshold value.

Next, a flow of output processing for outputting roads having a safety degree of less than the threshold value will be explained, with reference to FIG. 5. The output processing is performed by the CPU 20A deploying the output program from the ROM 20B to the RAM 20C, and executing the output program in the RAM 20C.

Figure 5:
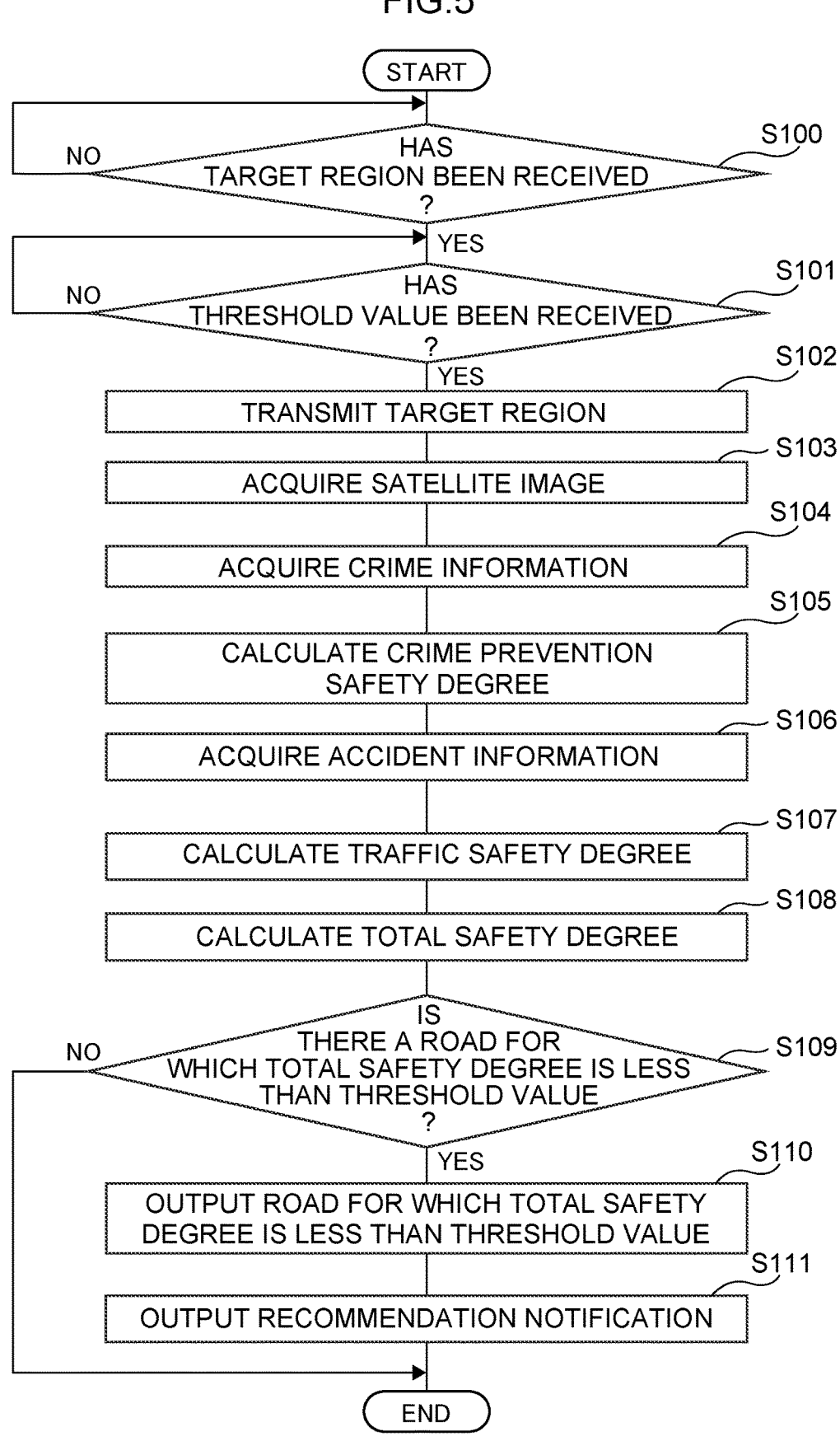
FIG. 5 is a flow chart illustrating an example of a flow of output processing according to the exemplary embodiment.

At step S100 in FIG. 5, the CPU 20A stands by until a target region is received. More specifically, the CPU 20A stands by until a target region is received from the user terminal 30. Upon receiving the target region (step S100: YES), the CPU 20A transitions to step S101.

At step S101, the CPU 20A stands by until a threshold value is received. More specifically, the CPU 20A stands by until a threshold value is received from the user terminal 30. Upon receiving the threshold value (step S101: YES), the CPU 20A transitions to step S102.

At step S102, the CPU 20A transmits the target region received at step S100 to the satellite server 10.

At step S103, the CPU 20A acquires a satellite image from the satellite server 10. More specifically, the CPU 20A acquires at least one satellite image in which the target region has been photographed during nighttime.

At step S104, the CPU 20A acquires crime information. More specifically, the CPU 20A acquires crime information relating to the target region from the event database.

At step S105, the CPU 20A calculates the crime prevention safety degrees. More specifically, the CPU 20A calculates the sums of the evaluation values of brightness of the roads appearing in the satellite image photographed during nighttime and the evaluation values of crime information relating to crimes that have occurred on the roads.

At step S106, the CPU 20A acquires accident information. More specifically, the CPU 20A acquires accident information relating to the target region from the event database.

At step S107, the CPU 20A calculates the traffic safety degrees. More specifically, the CPU 20A calculates the sums of the evaluation values of vehicles traveling on the roads appearing in the satellite image and the evaluation values of accident information relating to traffic accidents that have occurred on the roads.

At step S108, the CPU 20A calculates the total safety degrees. More specifically, the CPU 20A calculates the sums of the crime prevention safety degrees calculated at step S105 and the traffic safety degrees calculated at step S107.

At step S109, the CPU 20A determines whether or not there is a road for which the total safety degree is less than the threshold value received at step S101. In a case in which there is a road for which the total safety degree is less than the threshold value received at step S101 (step S109: YES), the CPU 20A transitions to step S110. On the other hand, in a case in which there are no roads for which the total safety degree less than the threshold value received at step S101 (step S109: NO), the CPU 20A ends the present output processing.

At step S110, the CPU 20A outputs, to the user terminal 30, the road for which the total safety degree is less than the threshold value received at step S101.

At step S111, the CPU 20A outputs a recommendation notification to the user terminal 30, and ends the present output processing. More specifically, the CPU 20A outputs, to the user terminal 30, a recommendation not to walk along the road for which the total safety degree is less than the threshold value received at step S101, and ends the present output processing.

NOTES

It should be noted that in the above-described exemplary embodiment, the center server 20, which is configured separately from the user terminal 30, is applied as the output device. However, there is no limitation to this example. A device that is built into the user terminal 30 may be applied as the output device.

Further, in the above-described exemplary embodiment, satellite images are accumulated in the satellite server 10, which is configured separately from the center server 20. However, there is no limitation to this example. The satellite images may be accumulated in a storage device such as the ROM 20B, a storage or the like that is included in the center server 20.

Further, in the above-described exemplary embodiment, the center server 20 calculates the safety degrees. However, there is no limitation to this example. A device other than the center server 20 may calculate the safety degrees. In this case, the center server 20 outputs the safety degrees that have been calculated by the device other than the center server 20.

Further, the processing executed by the CPU reading and executing software (a program) in the above-described exemplary embodiment may be executed by various types of processors other than a CPU. Such processors include programmable logic devices (PLD) that allow circuit configuration to be modified post-manufacture, such as a field-programmable gate array (FPGA) or the like, and dedicated electric circuits, which are processors including a circuit configuration that has been custom-designed to execute specific processing, such as an application specific integrated circuit (ASIC) or the like. Further, the processing described above may be executed by any one of these various types of processors, or by a combination of two or more of the same type or different types of processors (such as, for example, plural FPGAs, a combination of a CPU and an FPGA, or the like). Furthermore, the hardware structure of these various types of processors is, more specifically, an electric circuit combining circuit elements such as semiconductor elements or the like.

Further, in the above-described exemplary embodiment, although explanation has been given regarding an aspect in which the respective programs are stored (installed) in advance in the ROMs, there is no limitation thereto. The programs may be provided in a format recorded on a recording medium such as a compact disc read only memory (CD-ROM), a digital versatile disc read only memory (DVD-ROM), a universal serial bus (USB) memory or the like. Further, the programs may be provided in a format that is downloadable from an external device via a network.

The flow of processing explained in the above-described exemplary embodiment is also an example, and unnecessary steps may be excluded, new steps may be added, or the processing order may be rearranged, within a range that does not depart from the gist of the present disclosure.

Aside from this, the respective configurations of the satellite server 10, the center server 20, and the user terminal 30 explained in the above-described exemplary embodiment are examples, and may be modified according to circumstances, within a range that does not depart from the gist of the present disclosure.

What is claimed is:

1. An output device comprising:
   a memory; and
   a processor coupled to the memory, the processor configured to:
   acquire a satellite image in which a target region is photographed and event information relating to events that have occurred in the target region;
   acquire, as the event information, crime information relating to crimes that have occurred in the target region;
   evaluate the acquired satellite image and determine an evaluation value of brightness of a road appearing in the satellite image by:
      extracting road regions from the acquired satellite image by tracking road edges in the acquired satellite image; and
      calculating illuminance and brightness-related evaluation values from the extracted road regions;
   evaluate the acquired crime information and determine an evaluation value of the crime information, the evaluation value of the crime information being based on information in the acquired crime information indicating whether or not a crime has occurred and information relating to whether or not a person from whom assistance can be requested when a crime has occurred is present on the road;
   calculate a crime prevention safety degree based on the evaluation value of brightness of the road appearing in the satellite image and the evaluation value of the crime information;
   output, from among roads in the target region, a road for which the calculated crime prevention safety degree is less than a threshold value as an unsafe road; and
   cause a warning notification to be displayed on a display of a user terminal, the warning notification instructing the user not to walk on the unsafe road.

2. The output device according to claim 1, wherein the processor is further configured to:
   acquire, as the event information, accident information relating to traffic accidents that have occurred in the target region;

evaluate the acquired satellite image and determine an evaluation value of vehicles traveling on the road appearing in the satellite image;

evaluate the acquired accident information and determine an evaluation value of the of the accident information;

calculate a traffic safety degree based on the evaluation value of vehicles traveling on the road appearing in the satellite image and the evaluation value of the accident information; and output a road for which a traffic safety degree is less than the threshold value as the unsafe road.

3. The output device according to claim 1, wherein the processor is further configured to output, as the unsafe road, a road for which a sum of the crime prevention safety degree and the traffic safety degree is less than the threshold value.

4. The output device according to claim 1, wherein the processor is configured to output a recommendation not to walk along the road for which the safety degree is less than the threshold value.

5. The output device according to claim 1, wherein the processor is further configured to:

acquire, as the event information, accident information relating to whether or not a facility capable of responding when a traffic accident has occurred is present;

evaluate the acquired satellite image and determine an evaluation value of vehicles traveling on the road appearing in the satellite image;

evaluate the acquired accident information and determine an evaluation value of the of the accident information;

calculate a traffic safety degree based on the evaluation value of vehicles traveling on the road appearing in the satellite image and the evaluation value of the accident information; and output a road for which a traffic safety degree is less than the threshold value as the unsafe road.

\* \* \* \* \*